Oct. 18, 1932.   V. W. THOMPSON ET AL   1,883,110
LUBRICATING SYSTEM FOR INTERNAL COMBUSTION ENGINES
Original Filed Dec. 8, 1930   2 Sheets-Sheet 1
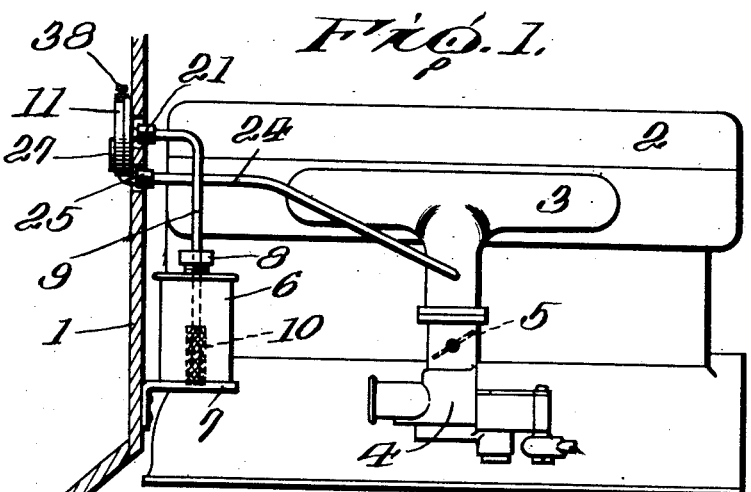
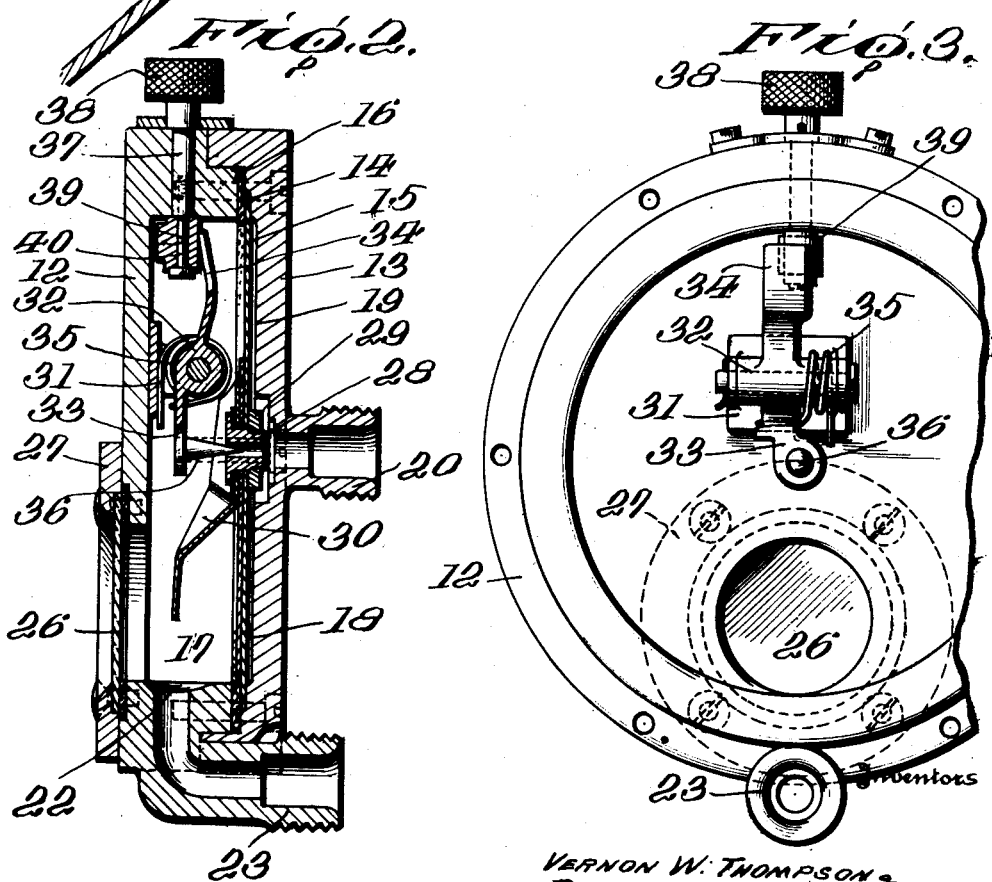
Vernon W. Thompson and
Burt N. Pierce,
Attorneys

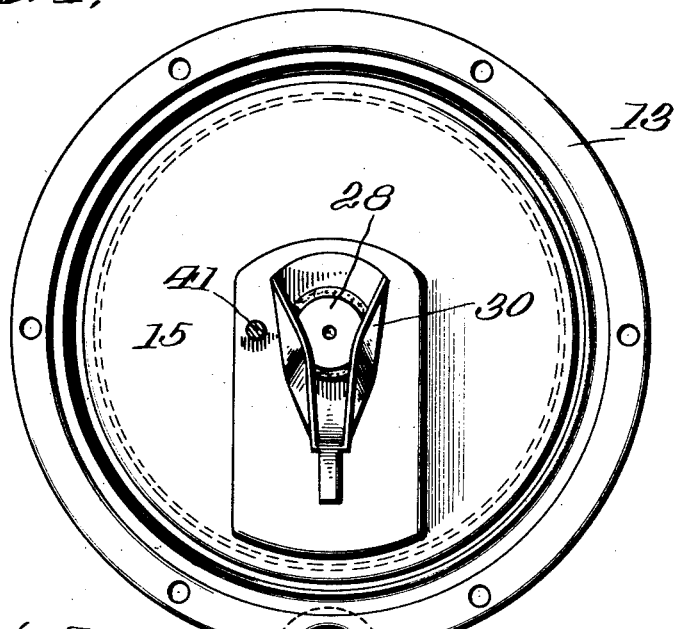
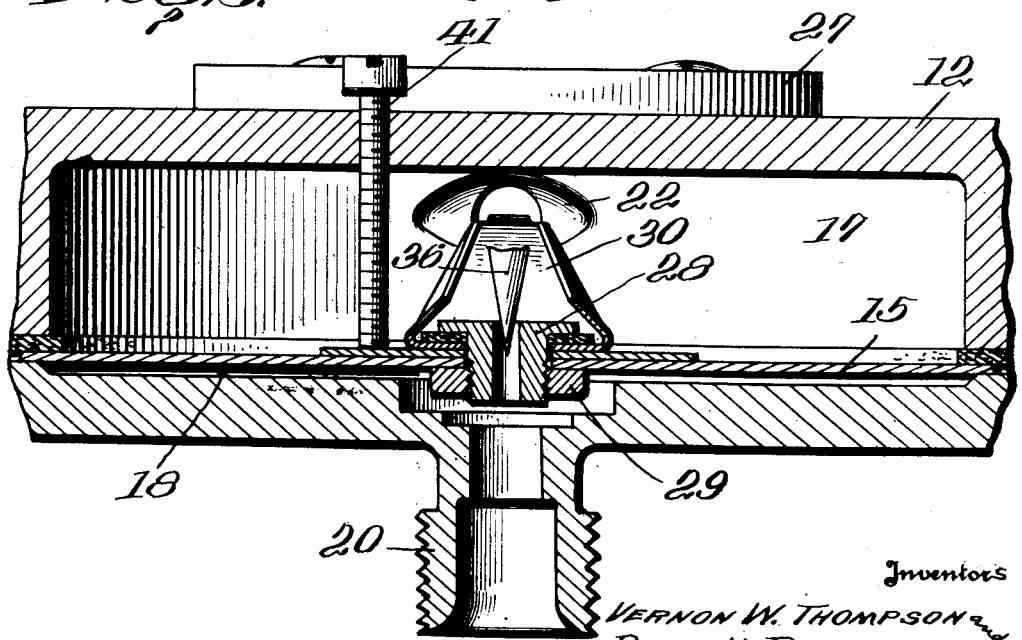

Patented Oct. 18, 1932

1,883,110

UNITED STATES PATENT OFFICE

VERNON W. THOMPSON AND BURT N. PIERCE, OF NEW YORK, N. Y., ASSIGNORS TO EMEROL MANUFACTURING CO., OF NEW YORK, N. Y., A CORPORATION OF ILLINOIS

LUBRICATING SYSTEM FOR INTERNAL COMBUSTION ENGINES

Application filed December 8, 1930, Serial No. 500,928. Renewed June 3, 1932.

This invention relates to a lubricating system for internal combustion engines and more particularly to an auxiliary lubricating system for introducing into the combustion chamber of the engine a lubricant in accordance with the requirements of the engine.

Another object of our invention is to provide a lubricating system in which a movable wall is disposed within a housing and adapted to be acted upon by the vacuum existing in the intake manifold of the internal combustion engine so as to control the amount of lubricant being drawn into the combustion chambers in accordance with the speed of the engine.

Another object of our invention is to provide novel means for regulating the amount of oil drawn into the combustion chamber by suction so that the system can be set to deliver a predetermined amount of lubricant into the combustion chambers, which amount will be varied according to the speed of the engine so that when the engine is idling, a very small quantity of lubricant will be delivered to the combustion chambers and as the speed of the engine increases, the quantity of lubricant admitted is increased.

A still further object of our invention is to provide a system in which the lubricant in its passage to the combustion chamber is caused to drip in view of a sight opening so that a sight feed is produced, whereby the operator of the engine can determine the amount of lubricant being fed to the combustion chambers.

A still further object of our invention is to provide a lubricating system with an auxiliary reservoir which can be placed at any remote position in respect to the engine and the lubricant therefrom will be drawn by suction into the combustion chambers by the displacement of the pistons so as to thoroughly lubricate the walls of the combustion chambers and the valves of the internal combustion engine.

Other and further objects and advantages of the invention will be hereinafter set forth and the novel features thereof defined by the appended claims.

In the drawings,

Figure 1 is a side elevation, partly in section, of an internal combustion engine used in connection with a motor vehicle showing the application of our improved construction of auxiliary lubricating system thereto;

Figure 2 is a vertical section through the housing showing the diaphragm and the valves;

Figure 3 is an elevation with the cover of the housing removed;

Figure 4 is an elevation showing the cover with the diaphragm; and

Figure 5 is a horizontal section showing the screw for controlling the movement of the diaphragm in order to allow the device to be set so that a small amount of lubricant will pass through the diaphragm at all times irrespective of the adjustment of the needle valve.

In the drawings we have shown the application of our improved construction of lubricating system to an internal combustion engine used in connection with a motor vehicle. 1 indicates the dash of a motor vehicle, 2 the engine, 3 the intake manifold, 4 the charge forming device and 5 the throttle valve therefor.

While we have shown an engine of the conventional type used in connection with motor vehicles, it is, of course, understood that our improved construction of lubricating system can be used in connection with an internal combustion engine used for motor boats or stationary engines and therefore we do not wish to limit the use of our improved construction of lubricating system to any particular form of engine.

In carrying out our invention we preferably employ an auxiliary reservoir 6, which is herein shown supported on the dash of the vehicle by a bracket 7 and preferably is in the form of a can with a removable cover 8 through which is adapted to pass a conduit 9 which is provided with a strainer 10 at its lower end within the can.

Disposed on the dash at any suitable point so that it can be readily observed by the operator of the motor vehicle is a housing 11 which is herein shown formed of a circular body 12 and a cover 13 which is adapted to be secured in position by screws 14 so as to hold the marginal edge of a circular diaphragm 15 tightly against a washer 16 in order to form chambers 17 and 18, the cover being cut out as clearly shown at 19.

The cover is provided with a centrally disposed externally threaded nipple 20 to which is connected the upper end of the conduit 9 by a coupling 21 and the chamber 17 is provided with an outlet 22 in its bottom which terminates in a threaded nipple 23 to which is connected a conduit 24 by a coupling 25, said conduit 24 having its other end extending through a suitable opening formed in the intake manifold 3 between the intake valves of the engine and the throttle valve of the charge forming device so that the chamber 17 will be subjected to the suction of the engine, whereby the diaphragm will be moved as will be hereinafter fully described.

The front of the housing 12 is provided with a sight opening enclosed by a glass 26 held in position by a ring 27 secured to the wall of the housing by screws as clearly shown so as to form an air tight joint around the sight opening.

The diaphragm 15 has secured therein an apertured plug 28 in alignment with the inlet nipple 20, said plug being secured therein by a nut 29 as clearly shown in Figures 2 and 5 and the plug is provided with an annular flange which engages a spout 30 and secures the same in position on the diaphragm so that the lubricant passing through the opening of the plug will be caught by the spout so as to drop past the sight opening into the outlet opening 22 of the chamber 17.

Secured within the chamber 17 is a bracket 31 having laterally projecting spaced arms between which is pivotally mounted a hub 32, which is provided with oppositely disposed arms 33 and 34, said hub being surrounded by a coil spring 35, one of the ends being in engagement with the arm 33 so as to normally move the arm towards the diaphragm 15. The arm 33 carries a needle valve 36 cooperating with the opening in the plug 28 so as to control the passage of lubricant therethrough.

Mounted in the top of the housing 12 is a vertically disposed shaft 37 which carries at its upper end a milled knob 38 so that it can be readily turned by the operator and has secured on its lower end a cam 39 herein shown secured in position by a screw 40, said cam cooperating with the arm 34 so as to rock the hub 32 in order to adjust the position of the needle valve 36 in respect to the opening of the plug, whereby the quantity of lubricant passing through the plug can be regulated.

In order to prevent the needle valve from being manually adjusted to such position that the opening in the plug would be entirely closed, we provide a set screw 41 mounted in the housing 12 and adapted to engage the diaphragm for limiting the movement of the diaphragm in one direction, whereby a small quantity of lubricant can be allowed to pass through the housing at all times irrespective of the suction of the engine and the adjustment of the needle valve.

In the operation of a lubricating system constructed in accordance with our invention, assuming the engine is idling, with the throttle valve substantially in closed position, a greater suction is obtained through the conduit or pipe 24 whereby a reduced pressure is produced in the chamber 17, which suction causes the movable wall or diaphragm to move or be drawn towards the needle valve so as to reduce the size of the passage through the diaphragm whereby only a small amount of lubricant will be drawn from the receptacle 6 by the suction of the engine and delivered to the combustion chambers and valves.

As the speed of the engine increases by the opening of the throttle, the suction is reduced and the flexible diaphragm moves back into its normal position so as to increase the size of the annular opening in the plug around the needle valve 36 whereby a greater quantity of lubricant will be drawn from the auxiliary reservoir 6 and delivered to the combustion chambers of the engine and by manipulating the knob 38, the operator can control to a nicety the quantity of lubricant being delivered to the combustion chambers of the engine.

If the adjusting screw 41 is set in such a position that the movement of the diaphragm is stopped so as to prevent the diaphragm from being moved to such an extent as to completely cut off or close the opening in the plug, a small quantity of lubricant will be drawn into the combustion chambers of the engine irrespective of the position of the throttle, but as the suction increases the flexible diaphragm will be moved towards the needle valve so as to reduce the quantity of lubricant being drawn into the combustion chamber and as the suction decreases as the speed of the engine increases, the diaphragm will be moved back into substantially its normal position so that the size of the opening around the needle valve will be increased whereby a greater quantity of lubricant will be drawn into the combustion chambers of the engine so that at high speed of the engine, the walls of the combustion chambers and the valves will be thoroughly lubricated by the auxiliary lubricating system.

While we have shown certain details of construction, especially when forming the control means for regulating the quantity of lubricant delivered to the combustion chambers in accordance with the speed of the engine, we are aware that various changes can be made without departing from the spirit of our invention.

From the foregoing description it will be seen that we have provided an auxiliary lubricating system for internal combustion engines wherein a movable wall is disposed in a conduit between the intake manifold of an internal combustion engine and an auxiliary source of supply of lubricant, said movable wall being acted upon by vacuum existing in the manifold of the internal combustion engine so as to control the quantity of lubricant delivered to the combustion chambers of the engine.

With the construction of lubricating systems for an internal combustion engine as herein shown and described, means is provided for regulating the amount of lubricant delivered to the cylinders of the engine by a movable apertured wall mounted in a casing between the source of lubricant supply and the intake of the engine so that the movable wall is acted on by suction so as to move said wall towards a needle valve so that the size of the aperture in the wall will be diminished when the engine is idling and the size of the aperture in the wall will be increased when the engine is running at high speed whereby we are able to control to a nicety the passage of lubricant being delivered to the engine.

What we claim is:

1. In a lubricating system of the kind described, the combination with an internal combustion engine having an intake manifold and a charge forming device connected thereto, a throttle valve controlling the passage of explosive charge of said charge forming device to said engine, a source of lubricant supply, a conduit extending from said source of lubricant supply to said intake manifold above said throttle valve, a casing disposed in said conduit, said casing having chambers formed by a movable wall, said movable wall being apertured and a needle valve cooperating with said aperture for regulating the passage of lubricant therethrough.

2. In a lubricating system of the kind described, the combination with an internal combustion engine having an intake manifold, a source of lubricant supply, a conduit extending from said source of supply to said intake manifold, a casing disposed in said conduit having a movable apertured wall and an adjustable needle valve cooperating with the aperture of said wall for regulating the passage of lubricant through said aperture.

3. A device for lubricating the cylinders, pistons and valves of internal combustion engines, comprising a casing having a diaphragm therein forming chambers, said diaphragm having an aperture, a source of lubricant supply connected to one of said chambers, a conduit extending from the other chamber to the intake of said engine, and a needle valve adjustably mounted in said casing cooperating with the aperture of said diaphragm for regulating the passage of lubricant therethrough.

4. In a lubricating system for internal combustion engines, the combination with an internal combustion engine having an intake manifold, a source of lubricant supply, a casing having a sight opening, a conduit connecting said casing with said source of lubricant supply, a conduit connecting said casing to the intake of said engine, a movable diaphragm disposed in said casing having an aperture and a needle valve cooperating with said aperture for regulating the passage of lubricant from said source of supply to said intake.

5. A lubricating device for internal combustion engines comprising a source of supply having a conduit extending therefrom in communication with the cylinders of the engine, a casing disposed in said conduit having a diaphragm provided with an aperture adapted to be moved by suction created by the displacement of the pistons of the engine and a needle valve cooperating with said aperture for regulating the passage of lubricant from the supply to the cylinders of the engine.

6. In a lubricating system for internal combustion engines, the combination with a source of supply, of a conduit extending from said source of supply and adapted to communicate with the intake of the engine, a casing disposed in said conduit having a flexible apertured diaphragm adapted to be moved by suction created by the displacement of the pistons of the engine and a needle valve cooperating with the aperture of said diaphragm for regulating the passage of lubricant from the source of supply to said engine.

7. In a lubricating system of the kind described, the combination with an internal combustion engine having an intake manifold, of a lubricant supply, a conduit extending from said source of supply to the intake of the engine, a casing disposed in said conduit having a movable wall forming chambers, said chambers being in communication with one another through an aperture formed in the movable wall and a needle valve cooperating with said aperture for controlling the passage of lubricant from said source of supply to said engine.

8. A lubricating system for internal combustion engines having an auxiliary reservoir for supplying lubricant to the pistons thereof, a conduit extending from said engine to said auxiliary reservoir and a casing disposed in said conduit having an apertured movable wall cooperating with a needle valve for regulating the passage of lubricant from said auxiliary reservoir to said engine.

9. A lubricating system for internal combustion engines having an auxiliary reservoir for supplying lubricant to the pistons thereof, a conduit extending from said auxiliary reservoir to the intake of said engine, a casing disposed in said conduit having a movable wall adapted to be moved by the suction of the engine, said wall having an aperture through which lubricant is adapted to pass and a needle valve cooperating with said aperture for regulating the quantity of oil passing from said reservoir to said engine.

10. In a lubricating system for internal combustion engines having an intake manifold and a charge forming device connected thereto, of an auxiliary reservoir having a conduit extending to said intake manifold at a point above said charge forming device, a casing disposed in said conduit having an apertured diaphragm, a needle valve cooperating with the aperture of said diaphragm for regulating the quantity of lubricant passing from said reservoir to said engine and adjustable means for limiting the movement of said diaphragm in one direction.

11. A device for lubricating the cylinders, pistons, and valves of internal combustion engines comprising a casing having chambers formed by a movable wall provided with an aperture, said casing being provided with a sight opening, an auxiliary reservoir, a conduit extending from said reservoir to one of said chambers, a conduit extending from the other chamber to said intake manifold, an oscillating needle valve having means for adjusting the position of the same in respect to the aperture of said movable wall for regulating the passage of lubricant from one chamber to the other and a spout carried by said movable wall for conveying the lubricant past said sight opening.

12. In a lubricating system for internal combustion engines, the combination with an auxiliary reservoir for containing the lubricant, of a conduit extending from said auxiliary reservoir to the intake of said engine, a casing disposed in said conduit, a movable apertured wall disposed in said casing, an oscillating needle valve cooperating with the aperture of said wall, and a cam for adjusting the position of said needle valve in respect to said aperture.

13. In a lubricating system of the kind described, the combination with an internal combustion engine having an intake manifold and a charge forming device connected thereto, a throttle valve controlling the passage of explosive charge from said charge forming device to said engine, a source of lubricant supply, a conduit extending from said source of supply to said intake manifold above the throttle valve, a casing disposed in said conduit having an apertured movable wall adapted to be moved by the suction of the engine and an adjustable needle valve mounted in said casing cooperating with the aperture of the movable wall for regulating the passage of lubricant drawn by the suction of the engine through the aperture of said movable wall to the intake of said engine.

14. A method of lubricating an internal combustion engine consisting in introducing a lubricant into the intake of said engine through an aperture formed in the movable wall adapted to be acted upon by the suction of the engine created by the displacement of the pistons, means for regulating the movement of said diaphragm in one direction and means cooperating with the aperture of said wall for regulating the passage of lubricant from the auxiliary supply to said engine.

15. A lubricating device for internal combustion engines comprising an auxiliary reservoir having a conduit extending therefrom and terminating in the intake of the manifold, a casing disposed in said conduit having a movable apertured wall adapted to be moved by the suction of the engine, a needle valve cooperating with the aperture of said wall, said movable wall being mounted to move towards said needle valve when the engine is idling and away from said needle valve when the engine is at high speed.

16. In a lubricating system for internal combustion engines, the combination with an internal combustion engine having an intake, a source of lubricant, a casing, a conduit connecting said casing with said source of lubricant supply, a conduit connecting said casing to the intake of said engine, a movable diaphragm disposed in said casing having an aperture, a spring pressed needle valve cooperating with said aperture for regulating the passage of lubricant from said source of supply to said intake, and a cam for adjusting said needle valve.

17. In a lubricating system for internal combustion engines, the combination with an internal combustion engine having an intake, a source of lubricant supply, a conduit extending from said source of supply to said intake, a casing disposed in said conduit having a movable apertured wall, a spout extending from the aperture of said wall over which lubricant is adapted to pass, and an adjustable needle valve cooperating with the aperture of said wall for regulating the passage of lubricant through said aperture.

18. In a lubricating system of the kind described, the combination with an internal combustion engine having an intake, a source of lubricant supply, a conduit extending from said source of supply to said intake, a casing disposed in said conduit having a movable apertured wall, an apertured plug secured in the aperture of said movable wall forming a valve seat and an adjustable needle valve cooperating with the aperture of said wall for regulating the passage of lubricant through said aperture.

19. In a lubricating system of the kind described, the combination with an internal combustion engine having an intake, a source of lubricant supply, a conduit extending from said source of supply to said intake, a casing disposed in said conduit having a movable apertured wall, an apertured plug secured in the aperture of said movable wall forming a valve seat, a spout carried by said plug and an adjustable needle valve cooperating with the valve seat of said plug for regulating the passage of lubricant therethrough.

20. In a lubricating system for internal combustion engines, the combination with a source of supply, of a conduit extending from said source of supply and adapted to communicate with the intake of the engine, a casing disposed in said conduit having a movable apertured wall adapted to be moved by the suction of the engine created by the displacement of the pistons and means cooperating with the aperture of said wall for regulating the passage of lubricant through said aperture to said engine.

In testimony whereof we hereunto affix our signatures.

VERNON W. THOMPSON.
BURT N. PIERCE.